US011064081B2

(12) United States Patent
Hasegawa

(10) Patent No.: US 11,064,081 B2
(45) Date of Patent: Jul. 13, 2021

(54) IMAGE FORMING APPARATUS

(71) Applicant: CANON KABUSHIKI KAISHA, Tokyo (JP)

(72) Inventor: Bungo Hasegawa, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/903,757

(22) Filed: Jun. 17, 2020

(65) Prior Publication Data

US 2021/0006679 A1 Jan. 7, 2021

(30) Foreign Application Priority Data

Jul. 5, 2019 (JP) ................................. 2019-126327

(51) Int. Cl.
*H04N 1/00* (2006.01)
*G03G 21/16* (2006.01)

(52) U.S. Cl.
CPC ..... *H04N 1/00554* (2013.01); *G03G 21/1604* (2013.01); *H04N 1/0062* (2013.01); *H04N 1/00795* (2013.01)

(58) Field of Classification Search
CPC ............. H04N 1/00708; H04N 1/0057; H04N 2201/0081; H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/042–04798; H04N 1/00–00005; H04N 1/00021–00047; H04N 1/00058–0009; H04N 1/27–31; H04N 1/32144–32352; H04N 1/38–419; H04N 1/46–648; H04N 2201/00–0006; H04N 1/3269–3271; H04N 1/33378; H04N 1/00554; H04N 1/00795; H04N 1/0062; H04N 1/00525; H04N 1/10; H04N 2201/0422; G06K 15/025–027; G06K 15/129; G06K 15/1825; G06K 15/1826; G06K 15/1835–1847; G06K 15/1848–1855; G06K 15/1867–1881; G06K 15/1889–1898; G06K 2215/004–008; G06K 2215/0094; G03G 21/1604; B65H 1/04; B65H 1/266

(Continued)

(56) References Cited

U.S. PATENT DOCUMENTS 8,325,391 B2 * 12/2012 Yamasaki .......... H04N 1/00557
358/474
8,564,857 B2 * 10/2013 Kurokawa ............. G03G 15/80
358/498

(Continued)

FOREIGN PATENT DOCUMENTS

JP 2010-154186 7/2010

*Primary Examiner* — Negussie Worku
(74) *Attorney, Agent, or Firm* — Venable LLP

(57) ABSTRACT

An image forming apparatus includes a main assembly including a main assembly frame and an image forming portion; a reading unit including a reading frame, a placing portion, a reading portion, and a hinge supporting portion; a hinge; and an openable unit. The hinge supporting portion includes a first fixing portion fixed to the reading frame and a second fixing portion provided adjacent to the main assembly frame and fixed to the main assembly frame.

18 Claims, 10 Drawing Sheets

(58) Field of Classification Search
USPC .................................................. 358/474, 498
See application file for complete search history.

(56) References Cited

U.S. PATENT DOCUMENTS

| | | | | |
|---|---|---|---|---|
| 8,711,406 B2* | 4/2014 | Ito | ....................... | G03G 21/1628 |
| | | | | 358/1.15 |
| 8,736,926 B2* | 5/2014 | Suzuki | ..................... | B65H 7/18 |
| | | | | 358/498 |
| 9,219,839 B2* | 12/2015 | Katayama | ........... | H04N 1/00588 |
| 9,516,184 B2* | 12/2016 | Tanaka | ............... | H04N 1/00559 |
| 2002/0067939 A1* | 6/2002 | Hamada | ............. | H04N 1/00554 |
| | | | | 399/367 |
| 2005/0184211 A1* | 8/2005 | Yarbrough | ............. | A47B 23/04 |
| | | | | 248/445 |
| 2007/0127962 A1* | 6/2007 | Fukumura | ............. | G03G 15/602 |
| | | | | 399/367 |
| 2010/0165418 A1 | 7/2010 | Yamasaki | ..................... | 358/474 |
| 2014/0118805 A1* | 5/2014 | Katayama | .......... | H04N 1/00554 |
| | | | | 358/498 |
| 2016/0065767 A1* | 3/2016 | Tanaka | ............... | H04N 1/00795 |
| | | | | 358/497 |

* cited by examiner

IMAGE FORMING APPARATUS

FIELD OF THE INVENTION AND RELATED ART

The present invention relates to an image forming apparatus for forming an image on a sheet.

In general, an image forming apparatus in which a printer main assembly for forming the image on the sheet and an image reading apparatus, provided above the printer main assembly, for reading the image on an original are integrally assembled has been known. The image reading apparatus includes an automatic document (original) feeder for continuously feeding originals (documents) (hereinafter, this feeder is referred to as an "ADF") and an image reading portion for reading the original fed by the ADF.

Conventionally, an image forming apparatus in which the ADF is supported by the image reading portion so as to be openable relative to the image reading portion through a hinge portion provided on a rear surface of the image reading portion has been proposed (Japanese Laid-Open Patent Application (JP-A) 2010-154186). On an upper surface of the image reading portion, a contact glass on which the original is capable of being stacked is provided, and is exposed by opening the ADF.

A frame of the image reading portion is formed with a galvanized steel sheet (SECC), and on a rear side surface of the frame, a guide rail for guiding a carriage for reading an original image is mounted. On a hinge receiver (support) described in JP-A 2010-154186, large rotation moment acts by opening and closing of the ADF. When this rotation moment acts on the frame of the image reading portion through the hinge receiver, the frame is deformed, so that original reading accuracy lowers. For this reason, the frame of the image reading portion is formed by an expensive steel sheet (plate) in order to ensure high rigidity, so that the use of the expensive steel sheet constituted an obstacle to cost reduction.

SUMMARY OF THE INVENTION

A principal object of the present invention is to provide an image forming apparatus capable of cost reduction.

According to an aspect of the present invention, there is provided an image forming apparatus comprising: a main assembly including a main assembly frame and an image forming portion supported by the main assembly frame and configured to form an image on a sheet; a reading unit including a reading frame, a placing portion on which the sheet is placed, a reading portion accommodated in the reading frame and configured to read the image on the sheet placed on the placing portion, and a hinge supporting portion provided adjacent to said reading frame, the reading unit being supported by the main assembly; a hinge supported by the hinge supporting portion; and an openable unit including a pressing portion configured to press, from above, the sheet placed on the placing portion, the openable unit being supported by the reading unit so as to be openable about a shaft relative to the reading unit, wherein the hinge supporting portion includes a first fixing portion fixed to the reading frame and a second fixing portion provided adjacent to the main assembly frame and fixed to the main assembly frame.

Further features of the present invention will become apparent from the following description of exemplary embodiments with reference to the attached drawings.

BRIEF DESCRIPTION OF THE DRAWINGS

Part (a) of FIG. 1 is a schematic view showing entirety of a printer according to an embodiment, and part (b) of FIG. 1 is a schematic view showing an image forming engine.

DESCRIPTION OF EMBODIMENTS

[General Structure]

Figure 1:
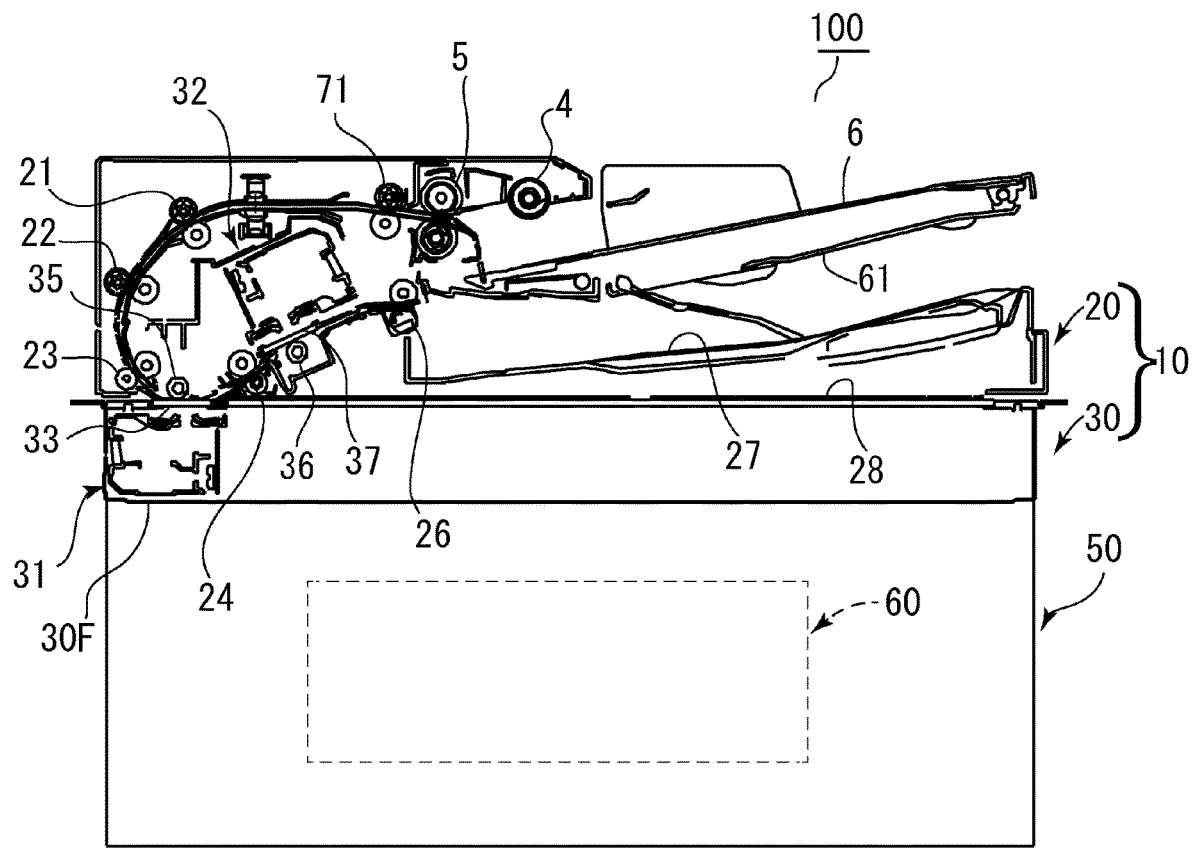
Figure 1:
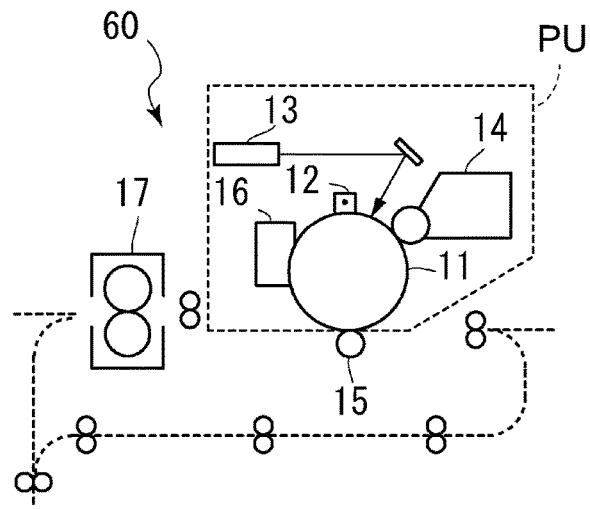

A printer 100 as an image forming apparatus according to the present invention is a laser beam printer of an electrophotographic type. The printer 100 includes, as shown in (a) of FIG. 1, a printer main assembly 50 as an apparatus main assembly and an image reading apparatus 10 mounted on an upper portion of the printer main assembly 50. In the following description, a sheet includes, in addition to plain paper, special paper such as coated paper, a recording material having a special shape such as an envelope or index paper, and a plastic film for an overhead projector, a cloth and the like, and the original is also an example of the sheet. The original which is the example of the sheet may also be white paper or a sheet on which an image is formed on one surface or on which images are formed on double surfaces.

The printer main assembly 50 includes an image forming engine 60 therein. The image forming engine 60 includes an image forming unit PU of the electrophotographic type and a fixing device 17. The image forming unit PU as an image forming portion is accommodated in a main assembly frame 85 (FIG. 7) described later. When an instruction to start an image forming operation is provided, a photosensitive drum 1 which is a photosensitive member is rotated, and a drum surface is electrically charged uniformly by a charging device 12. Then, an exposure device 13 modulated and outputs laser light on the basis of image data sent from the image reading apparatus 10 or an external computer, so that the surface of the photosensitive drum 11 is scanned with the laser light and thus an electrostatic latent image is formed thereon. This electrostatic latent image is visualized (developed) into a toner image by toner supplied from a developing device 14.

In parallel to such an image forming operation, a feeding operation for feeding, toward the image forming engine 60, the sheet stacked on an unshown cassette or an unshown manual feeding tray. The fed sheet is conveyed in synchronism with progression of the image forming operation by the image forming unit PU. Then, the toner image carried on the photosensitive drum 11 is transferred onto the sheet by a transfer roller 15. The toner remaining on the photosensitive drum 11 after the toner image transfer is collected by a cleaning device 16. The sheet on which the (unfixed) toner image is transferred is delivered to the fixing device 17 and is heated and pressed by being nipped between a roller pair. The sheet on which the toner is melted and fixed is discharged by a discharging roller pair and the like.

[Image Reading Apparatus]

Next, the image reading apparatus 10 will be specifically described. The image reading apparatus 10 includes, as shown in part (a) of FIG. 1, an ADF 20 for feeding and discharging, to a discharge tray 27, the original stacked on an original tray 6 as a stacking portion and a reading unit 20 for reading the original fed by the ADF 20.

The ADF 20 includes a feeding roller 4 as a feeding portion, a separation roller pair 5, a drawing roller pair 71, conveying roller pairs 21, 22, 23 and 24, a platen glass 37, platen guide rollers 35 and 36, a discharging roller pair 26, and a second reading portion 32.

The reading unit 30 includes a platen glass 33, an original supporting platen glass 28 as a placing portion, and a first reading portion 31 as a reading portion. Inside each of the first reading portion 31 and the second reading portion 32, an illuminating device, a reading element, an image processing portion, a lens and a mirror which are unshown are provided. The first reading portion 31 is constituted so as to be movable is a sub-scan direction which is a left-right direction in part (a) of FIG. 1 by a wire and a driving motor which are unshown. Incidentally, to the illuminating device, various luminaries such as a xenon lamp and FED are applicable, and to the reading element, photoelectric conversion elements such as a CCD sensor, a CMOS sensor and a CIS sensor are applicable.

The image reading apparatus 10 reads image information from the original by an operation in a browsing (moving reading) mode in which the original image is scanned while feeding the original stacked on the original tray 6 by the ADF 20 and an operation in a fixed reading mode in which the original placed on the original supporting platen glass 28 is scanned. The operation in the browsing mode is selected, in the case where the original stacked on the original tray 6 is detected by an unshown original presence/absence sensor or in the case where a user explicitly provides an instruction through an operating panel or the like of the printer main assembly 50.

When the operation in the browsing mode is executed, the originals are separated and fed one by one by the feeding roller 4 and the separation roller pair 5. Then, the original is conveyed toward the platen glass 33 by the drawing roller pair 71 and the conveying roller pairs 22 and 23. The original passing through the platen glass 33 is guided by the platen guide roller 35 so as not to float from the platen glass 33.

Then, the image on a first surface (front surface) of the original is read by the first reading portion 31 through the platen glass 33. Specifically, the original during the feeding is irradiated with light from the illuminating device, so that reflected light from the original is guided to the lens through the mirror. Then, the light passed through the lens is formed as an image by the (image) reading element, and then is subjected to photoelectric conversion, so that image information is sent to a CPU. The original passed through the platen glass 33 is guided to the conveying roller pair 24, and an image on a second surface (back surface) of the original is read by the second reading portion 32 through the platen glass 37 while being conveyed by the conveying roller pair 24.

The original passed through the platen glass 37 is guided by the platen guide roller 36 so as not to float from the platen glass 37. Incidentally, there is no need that the images on the double surfaces (sides) of the original are not necessarily to be read, but the image on either one of the first surface and the second surface of the original may also be read. Then, the original on which the image is read is discharged to a discharge tray 27 by the discharging roller pair 26.

On the other hand, the operation in the fixed reading mode is selected in the case where the device detects the original stacked (placed) on the original supporting platen glass 28 or in the case where the user explicitly provides an instruction through the operating panel or the like of the printer main assembly 50. In this case, the original on the original supporting platen glass 28 does not move, and the first reading portion 31 moves along the original supporting platen glass 28. Then, the original is scanned with light emitted by the illuminating device in the first reading portion 31. The image information subjected to photo-electric conversion is transferred to the CPU.

[Hinge and Hinge Supporting Portion]

Figure 2:
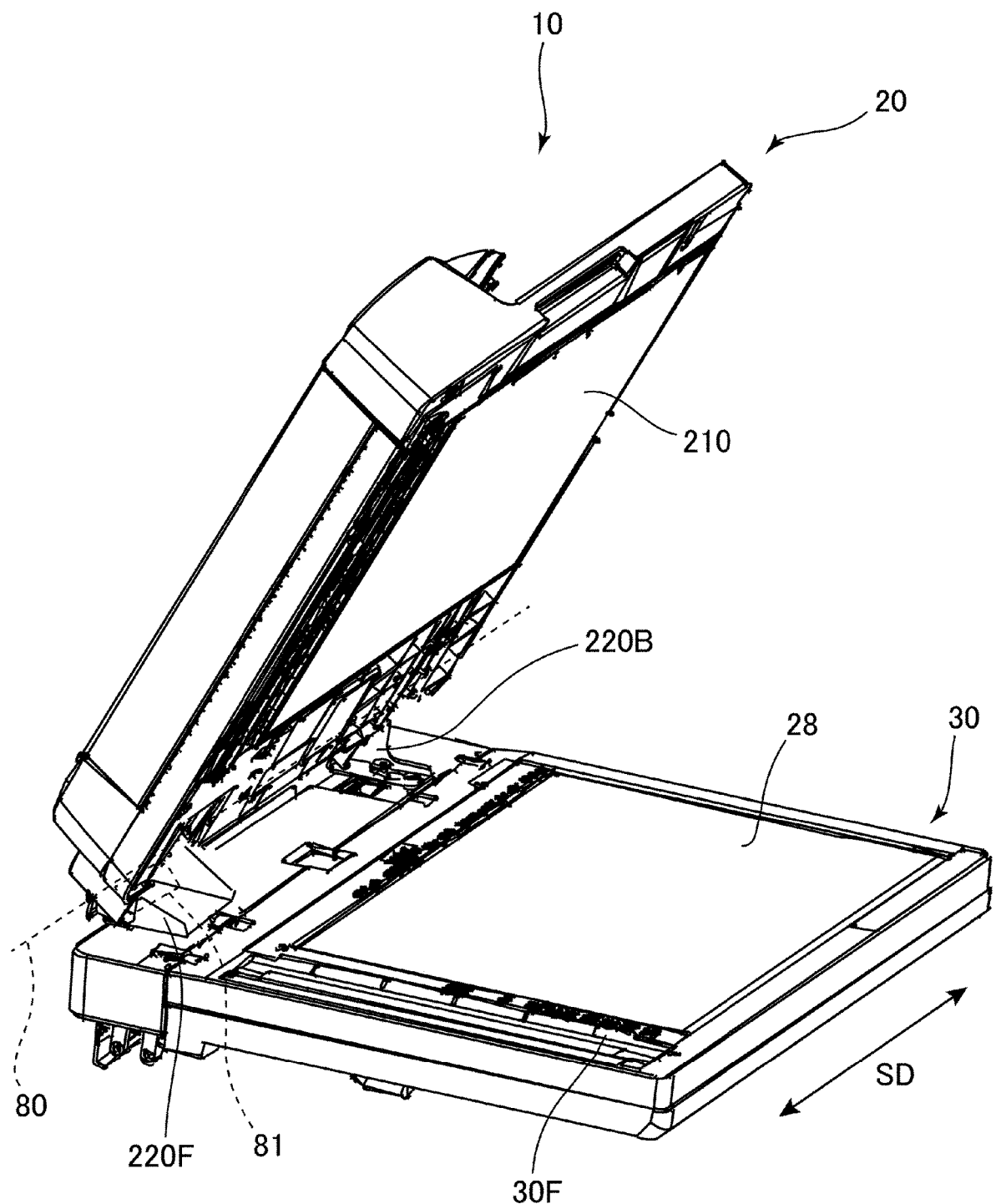
FIG. 2 is a perspective view showing an image reading apparatus.

Next, with reference to FIGS. 2 and 3, hinges 220F and 220B and hinge supporting portions 230F and 230B will be described. The reading unit 30 includes a reading frame 30F constituted by a resin material as shown in FIGS. 2 and 3, the reading frame 30F not only supports the original supporting platen glass 28 but also accommodate the first reading portion 31 (part (a) of FIG. 1) as the reading portion.

Further, the reading unit 30 includes the hinge supporting portions 230F and 230B disposed on a left side of the reading frame 30, and these hinge supporting portions 230F and 230B are covered with a cover 105. FIG. 3 is a rear view showing the image reading apparatus 10 in a state in which the cover 105 is dismounted. The hinge supporting portions 230F and 230B are provided in parallel with an interval with respect to a main scan direction SD and support the hinges 220F and 220B, respectively. That is, the hinge supporting portions 230F and 230B are provided adjacent to the reading frame 30 with respect to the horizontal direction. In other words, the hinge supporting portion 230B as a second hinge supporting portion is disposed at a different position from the hinge supporting portion 230F as a first hinge supporting portion with respect to an axial direction of an open/close shaft 80.

Figure 3:
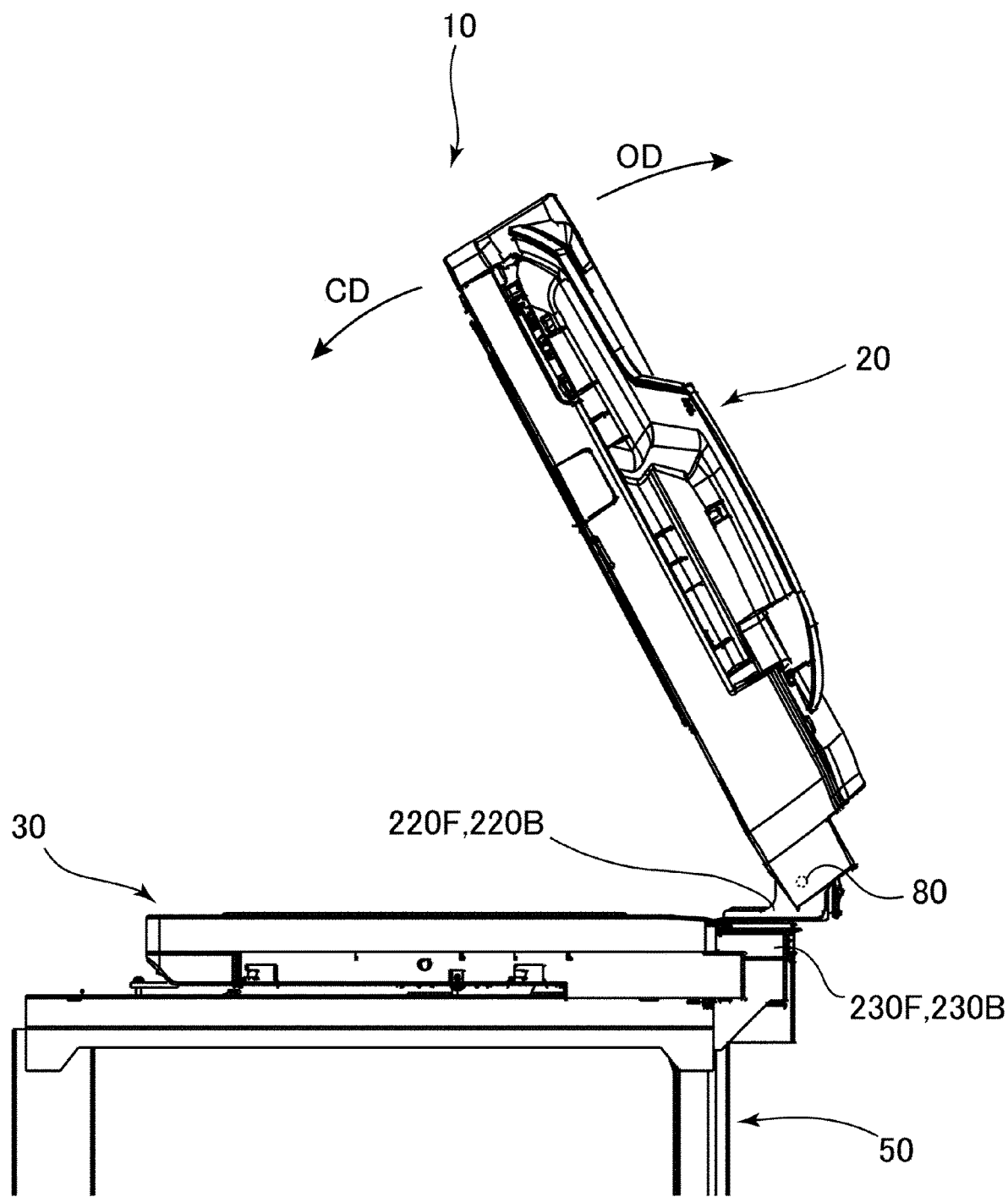
FIG. 3 is a rear view showing the image reading apparatus.

The ADF 20 is supported by the reading unit 30 through the hinges 220F and 220B so as to be openable about the open/close shaft 80, and is openable in an opening direction OD and a closing direction CD of FIG. 3. The axial direction of the open/close shaft 80 is parallel to the main scan direction SD. Further, the ADF as an openable unit includes a pressing portion 210 at a position opposing the original supporting platen glass 28. The pressing portion 210 is closed to the reading unit 30, and presses the original placed on the original supporting platen glass 28 from above, so that positional deviation of the original is reduced. On a side opposite from a surface, of the pressing portion 210, contacting the original, a plurality of cushioning members (not shown) are applied onto the pressing portion 210, so that the original is pressed against the original supporting platen glass 28 by a repelling force of the cushioning members.

The hinges 220F and 220B include base portions fixed to the hinge supporting portions 230F and 230B, respectively, and rotatable portions not only supported rotatably about the open/close shaft 80 relative to the base portions but also fixed to the ADF 20. Further, the hinge 220 F as a first hinge is provided with a spring 81 as an urging member for urging the ADF 20 in the opening direction OD, but the hinge 220B as a first hinge is not provided with such an urging member. In other words, the spring 81 is provided in only the hinge 220F as the first hinge. The hinge 220F is provided with the spring 81, so that an operating force for opening the ADF 20 by the user is assisted, and therefore, usability can be improved.

[Hinge Supporting Portion]

Figure 4:
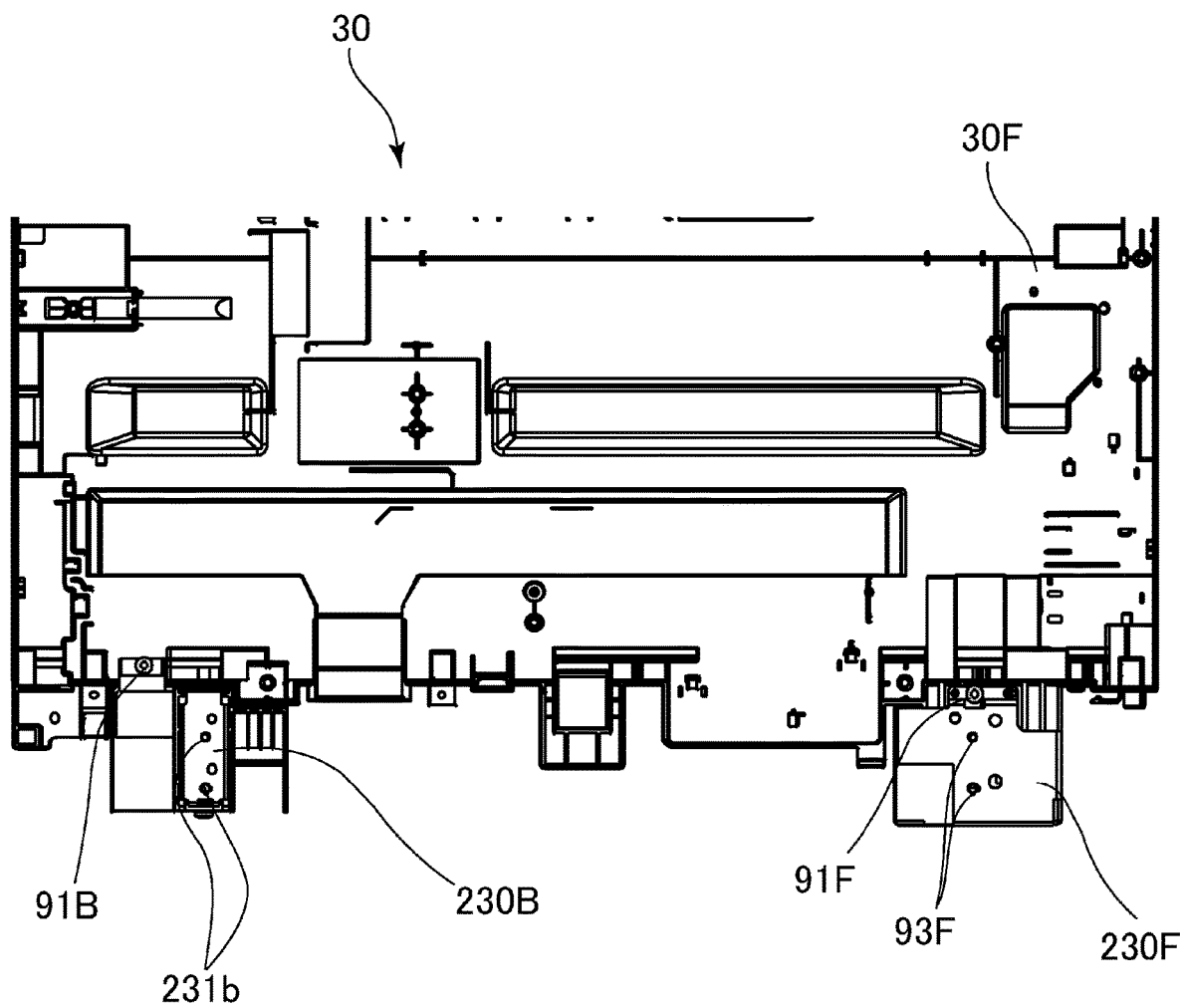
FIG. 4 is a top plan view showing a reading frame and a hinge supporting portion.
Figure 5:
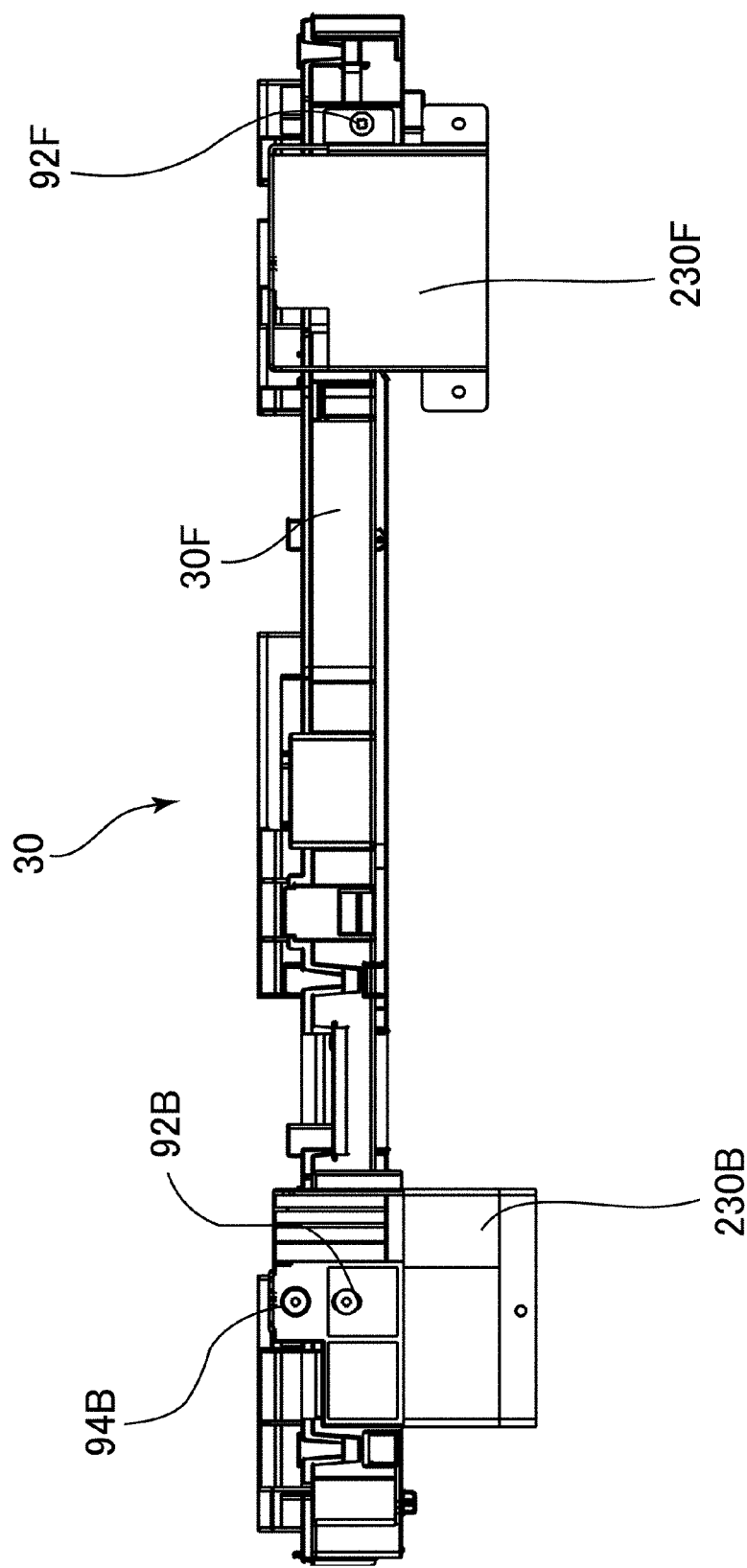
FIG. 5 is a side view showing the reading frame and the hinge supporting portion.

Next, structures of the hinge supporting portions 230F and 230B will be specifically described. FIG. 4 is a top plan view showing the reading frame 30 and the hinge supporting portion 230F and 230B. FIG. 5 is a side view showing the reading frame 30 and the hinge supporting portions 230F and 230B.

As shown in FIGS. 4 and 5, the hinge supporting portion 230F includes a screw hole 91F formed in an upper surface thereof and a screw hole 92F formed in a rear surface thereof, which are fixed to the reading frame 30F with screws. These screw holes 91F and 92F constitute a first fixing portion. Further, the hinge supporting portion 230B include a screw hole 91B formed in an upper surface thereof and a screw hole 92B formed in a rear side thereof, which are fixed to the reading frame 30F with screws. These screw holes 91B and 92B constitute a third fixing portion. Further, the hinge supporting portion 230F is fixed to the hinge 220F with screws at screw holes formed on the upper surface thereof.

Figure 6:
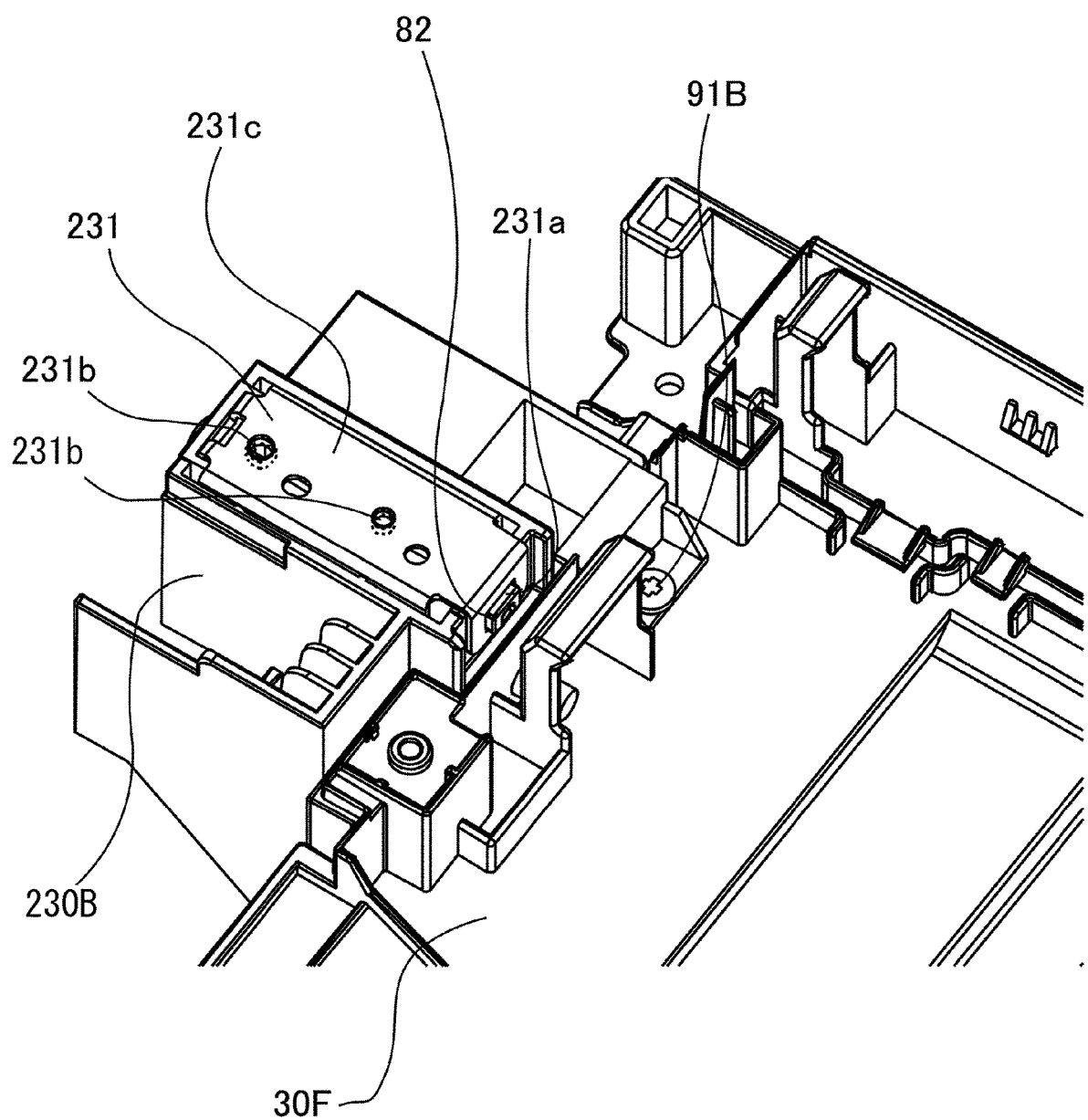
FIG. 6 is an enlarged perspective view showing the hinge supporting portion.

As shown in FIG. 6, the hinge supporting portion 230B is constituted by a resin material, and on an upper portion of the hinge supporting portion 230B, a hinge plate 231 as a reinforcing member constituted by a metal material is mounted. The hinge supporting portion 230B is provided with a projection 82 projecting toward the front side of the image reading apparatus, and the hinge plate 231 is bent in a U-shape at each of a front end portion and rear end portion thereof. Then, in a state in which holes 231a formed at the front end portion of the hinge plate 231 are engaged with the projection 82 of the hinge supporting portion 230B, as shown in FIG. 5, the rear end portion of the hinge plate 231 is fastened together with a screw hole 94B of the hinge supporting portion 230B by a screw.

In an upper surface 231c of the hinge plate 231, a screw hole 231b is formed, and this screw hole 231b is fixed to the hinge 220B with a screw. By this, the hinge supporting portion 230B is integrally fixed to the hinge 220B through the hinge plate 231.

Further, the upper surface 231c of the hinge plate 231 intimately contacts the cover 105 toward the hinge 220B, and receives a load from the hinge 220B with reliability. Thus, the hinge supporting portion 230B is constituted by the resin material, but is reinforced by the hinge plate 231. Further, the hinge 220B is not provided with the spring 81 as provided in the hinge 220F, and therefore, reaction force as generated by the spring 81 does not act on the hinge supporting portion 230B. By this, rigidity necessary for the hinge supporting portion 230B is lower than rigidity for the hinge supporting portion 230F, and the hinge supporting portion 230B is constituted by the resin material, so that reductions in cost and weight can be realized.

Comparison Example

Figure 9:
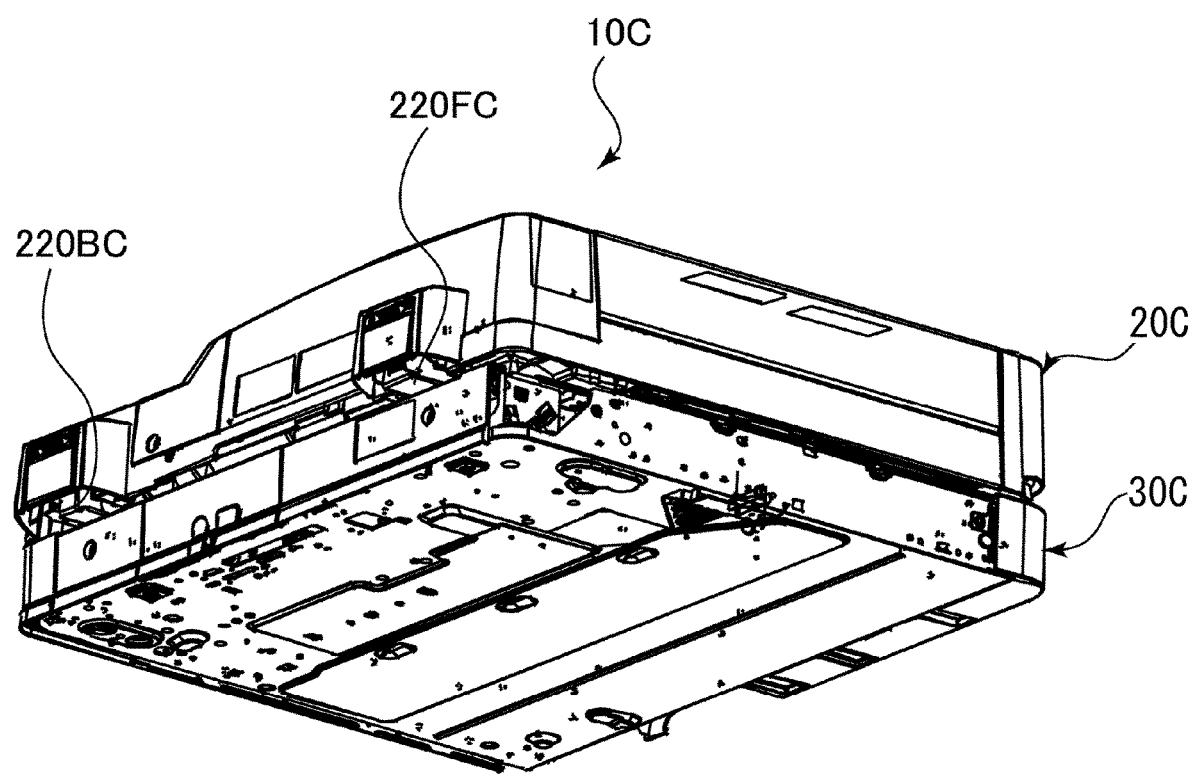
FIG. 9 is a perspective view showing an image reading apparatus according to a comparison example.
Figure 10:
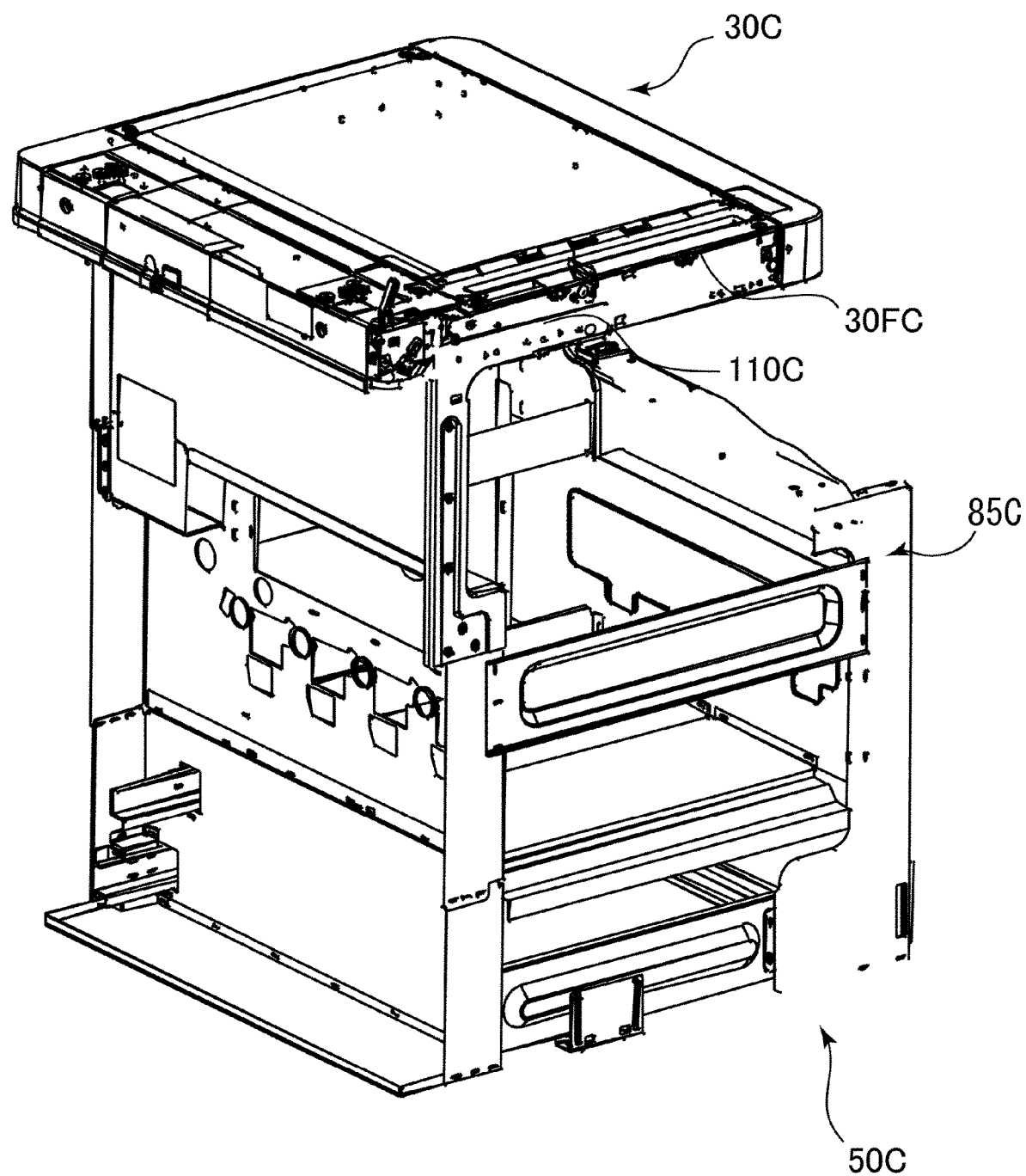
FIG. 10 is a perspective view showing a main assembly frame and a hinge supporting portion according to the comparison example.

Here, with reference to FIGS. 9 and 10, an image reading apparatus 10C as a comparison example will be described. As shown in FIGS. 9 and 10, the image reading apparatus 10C includes an ADF 20C and a reading unit 30C, and is mounted on an upper portion of a printer main assembly 50C. The ADF 20C is supported by the reading unit 30C through hinges 220FC and 220BC so as to be openable relative to the reading unit 30C.

The hinges 220FC and 220BC are supported by unshown hinge supporting portions, respectively, and these hinge supporting portions are fixed to a reading frame 30FC of the reading unit 30C. Further, as shown in FIG. 10, the reading frame 30FC is connected to a main assembly frame 85C of the printer main assembly 50C by a connecting member 110C.

Thus, the hinge supporting portions of the image reading apparatus 10C as the comparison example are not only fixed to the hinges 220FC and 220BC but also fixed to the reading frame 30FC. The reading frame 30FC is fixed to the main assembly frame 85C. For this reason, rotation moment generating when the ADF 20C is opened and closed acts on the reading frame 30FC through the hinges 220FC and 220BC and the hinge supporting portions. Other than the reading frame 30F, there is no member on which this rotation moments acts, and therefore, the reading frame 30F requires considerable rigidity. Therefore, the reading frame 30FC in the comparison example is constituted by a metal material.

[Fixing of Hinge Supporting Portion to Main Assembly Frame]

Figure 7:
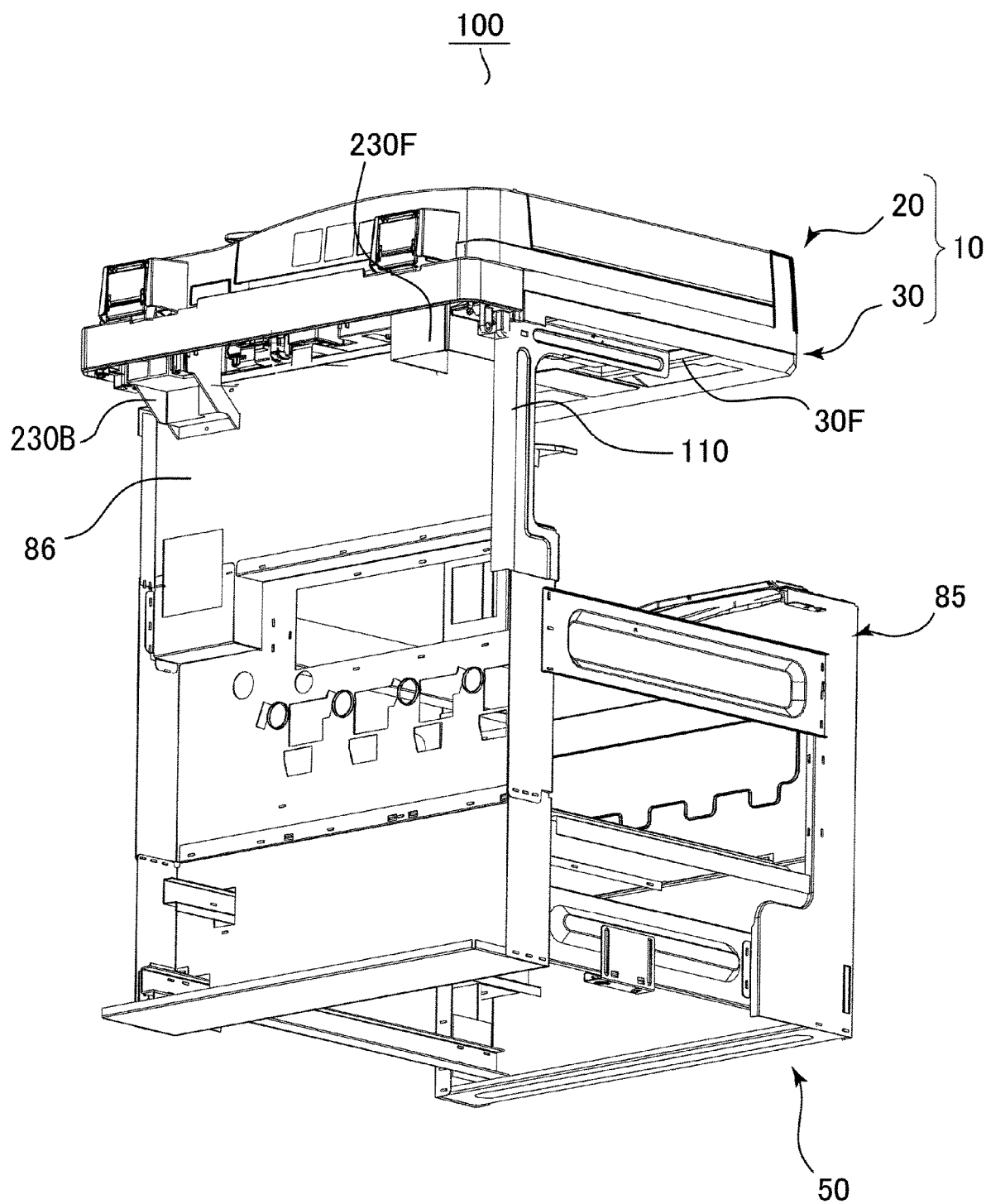
FIG. 7 is a perspective view showing a main assembly frame and the hinge supporting portion.

Next, a fixing method of the hinge supporting portions 230F and 230B to the main assembly frame 85 in this embodiment will be described. As shown in FIG. 7, the hinge supporting portions 230F and 230B extends downwardly than an upper end portion of the main assembly frame 85 of the printer main assembly 50. The main assembly frame 85 includes a frame surface 86 as a vertical surface extending in the vertical direction. The reading frame 30F is fixed to the main assembly frame 85 by the connecting member 110.

Figure 8:
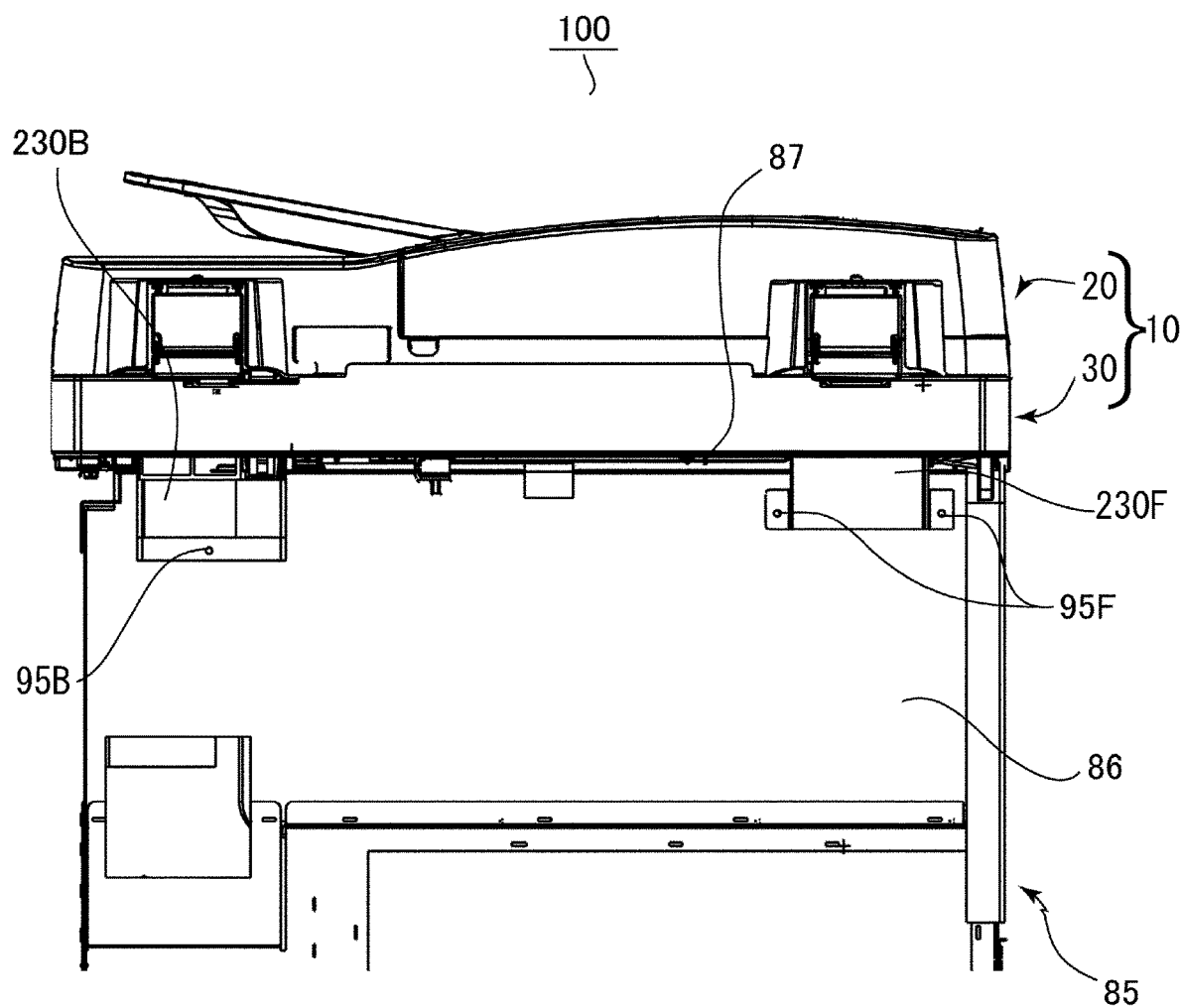
FIG. 8 is a side view showing the main assembly frame and the hinge supporting portion.

As shown in FIG. 8, the hinge supporting portion 230F is provided with screw holes 95F as a second fixing portion, and the screw holes 95F are fixed to the frame surface 86 by screws. Similarly, the hinge supporting portion 230B is provided with a screw hole 95B as a fourth fixing portion, and the screw hole 95B is fixed to the frame surface 86 by a screw. The screw holes 95F and 95B are positioned below an upper end 87 of the main assembly frame 85 and are adjacent to the frame surface 86. By this, the screw holes 95F and 95B are capable of being directly fixed to the frame surface 86 by the screws.

The frame surface 86 extends in the vertical direction and is capable of surface-receiving a force resulting from the rotation moment generating due to the opening and closing of the ADF 20. That is, the hinge supporting portions 230F and 230B surface-contact the frame surface 86, so that the frame surface 86 is capable of effectively distributing loads due to the opening and closing of the ADF 20, in a compression direction and a tensile direction.

As described above, the hinge supporting portions 230F and 230B are fixed to the reading frame 30F and the frame surface 86 of the main assembly frame 85. Further, the loads (the rotation moment and the left-weight of the ADF 20) acting on the hinge supporting portions 230F and 230B can be distributed to these reading frame 30F and frame surface 86.

For this reason, correspondingly to the load distributed to the frame surface 86, even when the rigidity of the reading frame 30F is lowered, the reading frame 30F is not distorted, so that it is possible to ensure reading accuracy of the original. Therefore, while ensuring the reading accuracy of the original, the reading frame 30F can be constituted by the resin material, so that the image forming apparatus is capable of reducing cost and weight.

Particularly, in recent years, performance improvement of the ADF is advanced, so that the ADF high in productivity is constituted so as to be capable of stacking a large number of originals. In this case, the rotation moment and the self-weight of the ADF generating due to the opening and closing of the ADF become large, so that the loads acting on the hinge supporting portions 230F and 230B also become large. Therefore, when enhancement of the rigidity of the reading frame 30F is considered so as not to cause the reading frame 30F to become deformed, the reading frame 30F has to be constituted by the metal material. However, as in this embodiment, the loads acting on the hinge supporting portions 230F and 230B are distributed to the reading frame 30F and the frame surface 86 of the main assembly frame 85, so that the reading frame 30F can be constituted by the resin material, not the metal material.

Further, the hinge 220B is not provided with the spring, and therefore, the rigidity needed for the hinge supporting portion 230B becomes low, and the hinge supporting portion 230B is constituted by the resin material, so that cost reduction and weight reduction can be realized.

Other Embodiments

In the above-described embodiment, the reading frame 30F was constituted by the resin material, but the present invention is not limited thereto. For example, the reading frame 30F may also be constituted by a metal material such as a thin metal plate. By this, an amount of the metal material used can be reduced, so that the cost can be reduced. Further, the hinge supporting portions 230F and 230B are not limited to be fixed to the frame surface 86 of the reading frame 30F but may also be fixed to another portion of the reading frame 30F.

Further, in the above-described embodiment, the two hinges and the two hinge supporting portions were provided, but the present invention is not limited thereto. For example, a single or three or more hinges and a single or three or more hinge supporting portions may also be provided.

In the above-described embodiment, the hinge supporting portion 230B was constituted by the resin material, but may also be constituted by the metal material such as the metal plate. Further, the hinge supporting portion 230F may also be constituted by the resin material.

In the above-described embodiment, the hinges 220F and 220B were fastened to the hinge supporting portions 230F and 230B with the screws, but the present invention is not limited thereto. For example, the hinges 220F and 220B may also be supported so as to be movable in a height direction relative to the hinge supporting portions 230F and 230B, whereby even when a thick book is placed on the original supporting platen glass 28, a constitution in which the book is capable of being positioned by the pressing portion 210 with reliability.

In the above-described embodiment, the frame surface 86 was constituted by a flat surface extending in the vertical direction, but the present invention is not limited thereto, and a part of the frame surface 86 may also include drawn shaped portions to which the hinge supporting portions 230F and 230B may also be fixed.

In the above-described embodiment, description will made using the printer 100 of the electrophotographic type, but the present invention is not limited thereto. For example, the present invention is also applicable to an image forming apparatus of an ink jet type in which the image is formed on the sheet by ejecting ink liquid through nozzles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-126327 filed on Jul. 5, 2019, which is hereby incorporated by reference herein in its entirety.

What is claimed is:

1. An image forming apparatus comprising:
a main assembly including a main assembly frame and an image forming portion supported by said main assembly frame and configured to form an image on a sheet;
a reading unit including a reading frame, a placing portion which is supported by said reading frame and on which a original is placed, and a reading portion accommodated in said reading frame and configured to read the image on the original placed on said placing portion, said reading unit being supported by said main assembly;
an openable unit including a pressing portion configured to press, from above, the original placed on said placing portion, said openable unit being supported by said reading unit through a hinge so as to be openable about a shaft relative to said reading unit; and
a hinge supporting portion provided adjacent to said reading frame and configured to support the hinge,
wherein said hinge supporting portion includes a first fixing portion fixed to said reading frame and a second fixing portion provided adjacent to said main assembly frame and fixed to said main assembly frame.

2. An image forming apparatus according to claim 1, wherein said reading frame is constituted by a resin material.

3. An image forming apparatus according to claim 1, wherein said second fixing portion is positioned below an upper end of said main assembly frame.

4. An image forming apparatus according to claim 1, wherein said main assembly frame includes a vertical surface extending in a vertical direction, and
wherein said second fixing portion is fixed to the vertical surface.

5. An image forming apparatus according to claim 1, further comprising a fixing member configured to fix said reading frame to said main assembly frame.

6. An image forming apparatus according to claim 1, wherein said hinge supporting portion and said hinge are a first hinge supporting portion and a first hinge, respectively,
wherein said image forming apparatus further comprises,
a second hinge supporting portion provided to said reading unit and disposed at a position different from said first hinge supporting portion with respect to an axial direction of said shaft, and
a second hinge supported by said second hinge supporting portion,
wherein said openable unit is supported by said reading unit through said first hinge and said second hinge so as to be openable about said shaft,
wherein said second hinge supporting portion includes a third fixing portion fixed to said reading frame and a fourth fixing portion fixed to said reading frame.

7. An image forming apparatus according to claim 6, further comprising an urging member configured to urge said openable unit in a direction in which said openable unit opens relative to said reading unit,
wherein said urging member is provided only on said first hinge.

8. An image forming apparatus according to claim 6, wherein said first hinge supporting portion is constituted by a metal material,
wherein said second hinge supporting portion is constituted by a resin material, and
wherein said image forming apparatus further comprising a reinforcing member which is not only fixed to said second hinge supporting portion but also constituted by a metal material and which is configured to reinforce said second hinge supporting portion.

9. An image forming apparatus according to claim 1, wherein an axial direction of said shaft is parallel to a main scan direction of said reading portion.

10. An image forming apparatus according to claim 1, further comprising,
a stacking portion configured to stack the original, and
a feeding portion configured to feed the original stacked on said stacking portion,
wherein said reading portion is capable of reading the original fed by said feeding portion.

11. An image forming apparatus according to claim 1, wherein said hinge supporting portion is provided adjacent to said reading frame with respect to a horizontal direction.

12. An image forming apparatus according to claim 1, wherein said hinge supporting portion is constituted by a metal material.

13. An image forming apparatus according to claim 1, wherein said first fixing portion is fixed to said reading frame with a screw, and
wherein said second fixing portion is fixed to said main assembly frame with a screw.

14. An image forming apparatus according to claim 1, wherein said hinge includes a base portion fixed to said hinge supporting portion and a rotatable portion supported rotatably about said shaft relative to said base portions and fixed to said openable unit.

15. An image forming apparatus comprising:
a main assembly including a main assembly frame and an image forming portion supported by said main assembly frame and configured to form an image on a sheet;
a reading unit including a reading frame constituted by a resin material, a placing portion which is supported by said reading frame and on which an original is placed, and a reading portion accommodated in said reading frame and configured to read the image on the original placed on said placing portion, said reading unit being supported by said main assembly;
an openable unit including a pressing portion configured to press, from above, the original placed on said placing portion, a stacking portion configured to stack an original, and a feeding portion configured to feed the original stacked on said stacking portion to read the image on the original by said reading portion, said openable unit being supported by said reading unit through a hinge so as to be openable about a shaft relative to said reading unit; and
a hinge supporting portion provided adjacent to said reading frame with respect to a horizontal direction and configured to support the hinge,
wherein said hinge supporting portion extends downwardly than an upper end portion of said main assembly frame and includes a first fixing portion fixed to said reading frame with a screw and a second fixing portion positioned below the upper end of said main assembly frame and fixed to said main assembly frame with a screw.

16. An image forming apparatus according to claim 15, further comprising an urging member provided on said hinge and configured to urge said openable unit in a direction in which said openable unit opens relative to said reading unit.

17. An image forming apparatus according to claim 15, wherein said hinge supporting portion is constituted by a metal material.

18. An image forming apparatus according to claim 15, wherein said hinge includes a base portion fixed to said hinge supporting portion and a rotatable portion supported rotatably about said shaft relative to said base portions and fixed to said openable unit.

* * * * *